(12) United States Patent
Wang et al.

(10) Patent No.: US 11,088,796 B2
(45) Date of Patent: Aug. 10, 2021

(54) METHOD AND DEVICE FOR INDICATING UPLINK REFERENCE SIGNAL INFORMATION, AND STORAGE MEDIUM

(71) Applicant: ZTE CORPORATION, Guangdong (CN)

(72) Inventors: Yuxin Wang, Shenzhen (CN); Hao Wu, Shenzhen (CN); Yungok Li, Shenzhen (CN); Zhaohua Lu, Shenzhen (CN); Yijian Chen, Shenzhen (CN); Bo Gao, Shenzhen (CN)

(73) Assignee: ZTE Corporation, Guangdong (CN)

( * ) Notice: Subject to any disclaimer, the term of this patent is extended or adjusted under 35 U.S.C. 154(b) by 140 days.

(21) Appl. No.: 16/476,790

(22) PCT Filed: Dec. 22, 2017

(86) PCT No.: PCT/CN2017/118095
§ 371 (c)(1),
(2) Date: Oct. 21, 2019

(87) PCT Pub. No.: WO2018/126913
PCT Pub. Date: Jul. 12, 2018

(65) Prior Publication Data
US 2020/0044801 A1    Feb. 6, 2020

(30) Foreign Application Priority Data
Jan. 9, 2017  (CN) .......................... 201710014453.3

(51) Int. Cl.
*H04L 5/00* (2006.01)
*H04W 76/27* (2018.01)
*H04W 72/04* (2009.01)

(52) U.S. Cl.
CPC ......... *H04L 5/0048* (2013.01); *H04W 72/042* (2013.01); *H04W 76/27* (2018.02); *H04W 72/044* (2013.01)

(58) Field of Classification Search
CPC .... H04L 5/0048; H04W 76/27; H04W 72/042
See application file for complete search history.

(56) References Cited

U.S. PATENT DOCUMENTS

2015/0222402 A1* 8/2015 Ouchi ........................ H04L 5/00
2017/0280454 A1* 9/2017 Kusashima ....... H04W 72/0453

FOREIGN PATENT DOCUMENTS

| CN | 101242384 A | 8/2008 |
| CN | 101772220 A | 7/2010 |

(Continued)

OTHER PUBLICATIONS

International Search Report of corresponding Patent Application No. PCT/CN2017/118095—4 pages (dated Mar. 8, 2018).

*Primary Examiner* — Ronald B Abelson
(74) *Attorney, Agent, or Firm* — Knobbe Martens Olson & Bear LLP

(57) ABSTRACT

A method and apparatus for indicating uplink reference signal information are provided. The method includes: indicating uplink reference signal information to a terminal through a signaling. The uplink reference signal information includes at least one of the following information: a transmission manner in which the terminal transmits an uplink reference signal, a transmission resource used by the terminal to transmit the uplink reference signal, a type of the uplink reference signal transmitted by the terminal, a cell identifier (ID) used by the uplink reference signal, and a virtual cell ID used by the uplink reference signal. Further provided in the embodiments of the present disclosure is a storage medium.

20 Claims, 2 Drawing Sheets

(56) References Cited

FOREIGN PATENT DOCUMENTS

| CN | 102264139 A | 11/2011 |
|---|---|---|
| CN | 103220791 A | 7/2013 |

\* cited by examiner

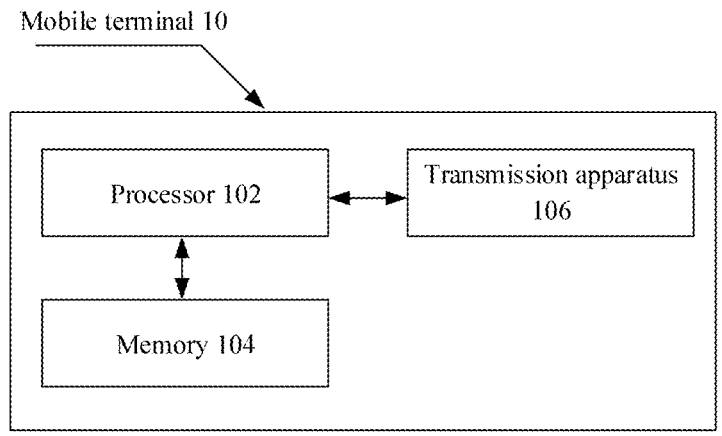

FIG. 1

Indicate uplink reference signal information to a terminal through signaling, where the uplink reference signal information includes at least one of the following information: a transmission manner in which the terminal transmits an uplink reference signal, a transmission resource used by the terminal to transmit the uplink reference signal, a type of the uplink reference signal transmitted by the terminal, a cell ID used by the uplink reference signal, or a virtual cell ID used by the uplink reference signal — S202

FIG. 2

Receive uplink reference signal information indicated by a base station through signaling, where the uplink reference signal information includes at least one of the following information: a transmission manner in which an uplink reference signal is transmitted, a transmission resource used for transmitting the uplink reference signal, a type of the transmitted uplink reference signal, a cell ID used by the uplink reference signal, or a virtual cell ID used by the uplink reference signal — S302

Transmit the uplink reference signal according to the uplink reference signal information — S304

FIG. 3

METHOD AND DEVICE FOR INDICATING UPLINK REFERENCE SIGNAL INFORMATION, AND STORAGE MEDIUM

This application is a U.S. National Stage Application, filed under 35 U.S.C. 371, of International Patent Application No. PCT/CN2017/118095, filed on Dec. 22, 2017, which is based on and claims priority to a Chinese patent application No. 201710014453.3 filed on Jan. 9, 2017, disclosure of which are incorporated herein by reference in their entireties.

TECHNICAL FIELD

The present disclosure relates to the field of communications and specifically, relates to a method and an apparatus for indicating uplink reference signal information, and a storage medium.

BACKGROUND

In the existing art, in Long Term Evolution (LTE for short), a physical downlink control channel (PDCCH for short) is used to carry uplink and downlink scheduling information and uplink power control information. Downlink control information (DCI for short) has following formats: DCI formats 0, 1, 1A, 1B, 1C, 1D, 2, 2A, 3, 3A, etc. And later, DCI formats 2B, 2C, and 2D are added into an evolved LTE-A Release 12 to support a variety of different applications and transmission modes. An e-Node-B (eNB for short) or a base station may configure a user equipment (UE for short) through downlink control information, or the UE is configured by a higher layer, which is also referred to as being configured through a higher-layer signaling.

Uplink reference signal may include various types of signals. In the existing art, problems exist in transmission of the uplink reference signal. Hereinafter, exemplarily, explanations are made based on sounding reference signal (SRS for short).

The SRS is a signal used between the UE and the base station for measuring radio channel state information (CSI for short). In the LTE system, the UE periodically transmits an uplink SRS on the last data symbol of a transmission subframe according to parameters, indicated by the eNB, such as a frequency band, a frequency domain position, a sequence cyclic shift, a period, and a subframe offset. The eNB determines the uplink CSI of the UE according to the received SRS, and performs operations such as frequency domain selection scheduling and closed loop power control according to the obtained CSI.

In the existing study of LTE-A Release 10, it is proposed that in uplink communication, a non-precoded SRS, that is, an antenna-specific SRS should be used, while a demodulation reference signal (DMRS for short) used for demodulation in a physical uplink shared channel (PUSCH for short) is precoded. The base station can estimate original uplink CSI by receiving the non-precoded SRS, while cannot estimate the original uplink CSI through the precoded DMRS. At this time, when the UE transmits the non-precoded SRS by using multiple antennas, more SRS resources are required by each UE, which results in a decrease in the number of UEs that can be simultaneously used in the system. The UE may be triggered to transmit the SRS in two triggering manners, that is, triggered by the higher-layer signaling (also referred to as trigger type 0) or triggered by the downlink control information (also referred to as trigger type 1). A periodic SRS is triggered through the higher-layer signaling, and a non-periodic SRS is triggered through the downlink control information. The manner of non-periodic transmission of the SRS is added to LTE-A Release 10, which improves the utilization rate of SRS resources to some extent and improves the flexibility of resource scheduling.

With the development of communication technologies, data services are in increasing demand and available low-frequency carriers are in short supply. Therefore, communication based on high-frequency (30 GHz to 300 GHz) carriers which have not been fully utilized becomes an important communication way of achieving high-speed data communication in the future. The high-frequency carrier communication has a large available bandwidth and can provide effective high-speed data communication. However, a big technical challenge for the high-frequency carrier communication is that high-frequency signals are attenuated significantly in space compared with low-frequency signals. Although this will cause spatial attenuation losses when the high-frequency signals are used for outdoor communication, the shorter wavelength of the high-frequency signals usually allows using more antennas. Therefore, the communication is implemented based on beams to compensate the spatial attenuation losses.

However, when the number of antennas increases, each antenna needs a set of radio frequency links, and digital beamforming thus brings about an increase in costs and a loss in power. Therefore, current studies tend to hybrid beamforming, that is, final beams are obtained through radio frequency beamforming together with digital beamforming.

With the development of beamforming technologies, the SRS may also be transmitted by using beams, and may be transmitted only on some beams. As in the existing art, if the uplink SRS is still periodically transmitted on the last data symbol of the transmission subframe, and the receiving end can periodically receive the SRS from the last data symbol of the transmission subframe, on one hand, the flexibility of the transmission of the SRS is greatly limited; on the other hand, since many transmission parameters of beam transmission of the SRS substantially differ from those of omnidirectional transmission of the SRS, if the receiving end still receives the beams according to the existing receiving mode, the receiving quality of the SRS may be poor, for example, the SRS cannot be successfully received or successfully decoded, thereby causing problems such as the failure of radio channel measurement.

SUMMARY

Embodiments of the present disclosure provide a method and apparatus for indicating uplink reference signal information and a method and apparatus for transmitting an uplink reference signal, to at least solve the problem in the existing art about transmitting an uplink reference signal.

An embodiment of the present disclosure provides a method for indicating uplink reference signal information. The method includes: indicating uplink reference signal information to a terminal through signaling. The uplink reference signal information includes at least one of the following information: information for indicating a transmission manner in which the terminal transmits an uplink reference signal, information for indicating a transmission resource used by the terminal to transmit the uplink reference signal, information for indicating a type of the uplink reference signal transmitted by the terminal, a cell identifier (ID) used by the uplink reference signal, or a virtual cell ID used by the uplink reference signal.

An embodiment of the present disclosure further provides a method for transmitting an uplink reference signal. The method includes: receiving uplink reference signal information indicated by a base station through signaling, where the uplink reference signal information includes at least one of the following information: a transmission manner in which an uplink reference signal is transmitted, a transmission resource used for transmitting the uplink reference signal, a type of the transmitted uplink reference signal, a cell ID used by the uplink reference signal, or a virtual cell ID used by the uplink reference signal; and transmitting the uplink reference signal according to the uplink reference signal information.

An embodiment of the present disclosure further provides an apparatus for transmitting an uplink reference signal. The apparatus includes: a reception module, which is configured to receive uplink reference signal information indicated by a base station through signaling, where the uplink reference signal information includes at least one of the following information: information for indicating a transmission manner in which an uplink reference signal is transmitted, information for indicating a transmission resource used for transmitting the uplink reference signal, or information for indicating a type of the transmitted uplink reference signal; and a first transmission module, which is configured to transmit the uplink reference signal according to the uplink reference signal information.

An embodiment of the present disclosure further provides an apparatus for transmitting an uplink reference signal. The apparatus includes: a generation module, which is configured to generate uplink reference signals in a manner agreed with a base station, where the uplink reference signals are generated in different frequency domain segments or different frequency domain sub-bands or different bandwidths by using different cell IDs or different virtual cell IDs; and a second transmission module, which is configured to transmit the generated uplink reference signals to the base station.

An embodiment of the present disclosure further provides a storage medium. The storage medium is configured to store computer-executable instructions for executing the steps described above.

Through the embodiments of the present disclosure, the uplink reference signal information is indicated to the terminal through the signaling. The uplink reference signal information includes: the transmission manner in which the terminal transmits an uplink reference signal, the transmission resource used by the terminal to transmit the uplink reference signal, the type of the uplink reference signal transmitted by the terminal, the cell ID used by the uplink reference signal, and the virtual cell ID used by the uplink reference signal. That is, the terminal transmits the uplink reference information according to the uplink reference signal information. Therefore, in the present embodiment, through transmission of the uplink reference information, the receiving end can be informed flexibly according to the transmission requirement of the SRS, whether the receiving end needs to receive the SRS, when to send the SRS, and of a beam or a time-frequency resource on which the SRS is transmitted, which obviously increases the flexibility of transmission of the SRS. On the other hand, through the transmission of the uplink reference signal information, the transmitting end (e.g., terminal) can be informed of a transmission parameter of the SRS, and the transmitting end can transmit the SRS according to the transmission parameter, which can ensure the probability that the receiving end successfully receives the SRS, and therefore ensure the successful transmission rate of the SRS transmitted by the beam and ensure the smooth progress of radio channel measurement.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings:

FIG. 1 is a structural block diagram illustrating hardware of a mobile terminal executing a method for indicating uplink reference signal information according to an embodiment of the present disclosure;

FIG. 2 is a flowchart of a method for indicating uplink reference signal information according to an embodiment of the present disclosure;

FIG. 3 is a flowchart of a method for transmitting an uplink reference signal according to an embodiment of the present disclosure;

DETAILED DESCRIPTION

Figure 4:
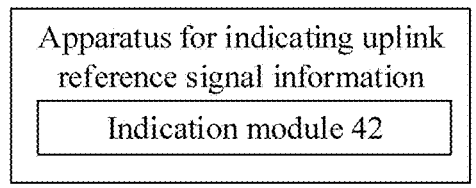
FIG. 4 is a structural block diagram of an apparatus for indicating uplink reference signal information according to an embodiment of the present disclosure.

The present disclosure will be described hereinafter in detail with reference to the drawings in conjunction with the embodiments. It is to be noted that if not in collision, the embodiments and features therein in the present application may be combined with each other. It is to be understood that the preferred embodiments described below are intended to explain and not to limit the present disclosure. It is to be noted that the terms "first", "second" and the like in the description, claims and drawings of the present disclosure are used to distinguish between similar objects and are not necessarily used to describe a particular order or sequence.

A method embodiment provided by embodiment 1 of the present application may be executed on a mobile terminal, a computer terminal or other similar computing apparatuses. The description below takes the method executed on the mobile terminal as an example. FIG. 1 is a structural block diagram illustrating hardware of a mobile terminal executing a method for indicating uplink reference signal information according to an embodiment of the present disclosure. As shown in FIG. 1, a mobile terminal 10 may include one or more (only one is shown in FIG. 1) processors 102 (the processor 102 may include, but is not limited to, a processing apparatus such as a microcontroller unit (MCU) and a programmable logic device FPGA), a memory 104 used for storing data, and a transmission apparatus 106 used for implementing a communication function. It should be understood by those skilled in the art that the structure shown in FIG. 1 is merely illustrative and not intended to limit the structure of the electronic apparatus described above. For example, the mobile terminal 10 may further include more or fewer components than the components shown in FIG. 1 or may have a configuration different from that shown in FIG. 1.

The memory 104 may be configured to store software programs and modules of application software, such as program instructions/modules corresponding to the method for indicating the uplink reference signal information in the embodiment of the present disclosure. The one or more processors 102 execute the software programs and modules stored in the memory 104 to perform various functional applications and data processing, that is, to implement the method described above. The memory 104 may include a high-speed random access memory, or may include a non-volatile memory, such as one or more magnetic storage apparatuses, flash memories or other nonvolatile solid-state memories. In some examples, the memory 104 may include memories that are remotely disposed with respect to the one or more processors 102. These remote memories may be connected to the mobile terminal 10 via a network. Examples of the preceding network include, but are not limited to, the Internet, an intranet, a local area network, a mobile communication network and any combination thereof.

The transmission apparatus 106 is configured to receive or transmit data via a network. Specific examples of such a network may include a radio network provided by a communication provider of the mobile terminal 10. In one example, the transmission apparatus 106 includes a network interface controller (NIC), which may be connected to other network devices via a base station, thereby communicating with the Internet. In one example, the transmission apparatus 106 may be a radio frequency (RF) module, which is configured to communicate with the Internet wirelessly.

The base station in the present disclosure may a base station of a macro cell, a base station or a transmission node of a small cell, a transmission node in a high-frequency communication system, a transmission node in an Internet of Things system, or other transmission nodes and device nodes which control a terminal. The terminal may be a receiving node, such as a UE, a mobile phone, a portable device, or a car, in a communication system. In summary, the base station may be a transmitting node that transmits signaling indicating a transmission manner, and the terminal may be a receiving node that receives the signaling.

A method for indicating uplink reference signal information is provided in an embodiment. FIG. 2 is a flowchart of a method for indicating the uplink reference signal information according to the embodiment of the present disclosure. As shown in FIG. 2, the method includes the steps described below.

In S202, uplink reference signal information is indicated to a terminal through signaling. The uplink reference signal information includes at least one of the following information: a transmission manner in which the terminal transmits an uplink reference signal, a transmission resource used by the terminal to transmit the uplink reference signal, a type of the uplink reference signal transmitted by the terminal, a cell ID used by the uplink reference signal, or a virtual cell ID used by the uplink reference signal.

Through the above step, the uplink reference signal information is indicated to the terminal through the signaling. The uplink reference signal information includes: the transmission manner in which the terminal transmits an uplink reference signal, the transmission resource used by the terminal to transmit the uplink reference signal, the type of the uplink reference signal transmitted by the terminal, the cell ID used by the uplink reference signal, and the virtual cell ID used by the uplink reference signal. That is, the terminal transmits the uplink reference signal according to the uplink reference signal information. Therefore, the problem in the existing art about transmitting the uplink reference signal can be solved, and the effect of implementing effective transmission of the uplink reference signal is achieved.

Optionally, the above steps may, but may not necessarily, be executed by a base station.

In an optional embodiment, the transmission manner may include at least one of: a transmit beam, a transmit antenna, a transmit sector, precoding at a transmitting end, a mannerindicated by an antenna port, a manner indicated by an antenna weight vector, a manner indicated by an antenna weight matrix, a space division multiplexing mode, a manner of frequency domain/time domain transmission diversity, a transmission sequence, the number of transmission layers, a transmission mode, a modulation and coding scheme, a manner indicated by a reference signal index, a spatial domain transmission filter, or a spatial quasi-co-location.

In an optional embodiment, the transmission resource may include at least one of: a time domain resource, a frequency domain resource, a code domain resource, a beam domain resource, or an antenna port resource.

In some embodiments, the uplink reference signal information is used for indicating, to the terminal, a transmission parameter of the uplink reference signal; and the transmission parameter may relate to a transmission manner, a transmission resource, a signal type of the uplink reference signal, a cell ID of a cell where performs the transmission, and other information.

Optionally, the transmission parameter may include at least one of: a transmit beam, a transmit antenna, a transmit sector, precoding at a transmitting end, an antenna port, an antenna weight vector, an antenna weight matrix, frequency domain transmission diversity, time domain transmission diversity, a modulation and coding scheme, a reference signal, a spatial domain transmission filter, a spatial quasi-co-location, a time domain resource, a frequency domain resource, a code domain resource, a beam domain resource, or an antenna port resource. Correspondingly, the uplink reference signal information may include: indication information in the transmission parameter.

In an optional embodiment, the method includes indicating the uplink reference signal information to the terminal through at least one of the following signalings: radio resource control (RRC) signaling; media access control control element (MAC CE) signaling; or physical downlink control signaling. In the present embodiment, each signaling described above is a relatively broader term, and the above signaling may be signaling in a data link layer or in another layer.

In an optional embodiment, the uplink reference signal may include at least one of: a measurement reference signal, an uplink demodulation reference signal, an uplink phase compensation reference signal, or a reference signal for uplink beam scanning or uplink beam tracking or uplink beam selection. In the present embodiment, the measurement reference signal may be a sounding reference signal, and the measurement reference signal may be a reference signal for uplink channel measurement or a reference signal for downlink channel measurement. In an optional embodiment, the type of the uplink reference signal may include at least one of: a wideband or full-bandwidth uplink reference signal, a narrowband or sub-band uplink reference signal, a non-precoded or precoded uplink reference signal, a wideband or full-bandwidth non-precoded uplink reference signal, a wideband or full-bandwidth precoded uplink reference signal, a narrowband or sub-band precoded uplink reference signal, a narrowband or sub-band non-precoded uplink reference signal, a beamformed uplink reference signal, a reference signal for uplink or downlink channel measurement, or a reference signal for uplink beam scanning or beam tracking or beam selection. In the present embodiment, the type of the uplink reference signal may be the type of the uplink channel measurement reference signal, that is, the uplink channel measurement reference signal may be a narrower term of the uplink reference signal. In an optional embodiment, the step of indicating the uplink reference signal information to the terminal through the signaling includes: configuring, through at least one of a first signaling, a second signaling or a third signaling, one or more sets of parameters or parameter sets or resources for the terminal to transmit the uplink reference signal.

In an optional embodiment, the step of indicating the uplink reference signal information to the terminal through the signaling may include: configuring, through the first signaling, M sets of parameters or parameter sets or resources for the terminal to transmit the uplink reference signal, where M is a positive integer; and selecting, through the second signaling, N sets of parameters or parameter sets or resources from the M sets of parameters or parameter sets or resources, where N is a positive integer less than or equal to M.

In an optional embodiment, the step of indicating the uplink reference signal information to the terminal through the signaling may include: selecting, through the third signaling, K sets of parameters or parameter sets or resources from the N sets of parameters or parameter sets or resources to configure transmission of the uplink reference signal, where K is a positive integer less than or equal to N.

In an optional embodiment, the at least one of the first signaling, the second signaling or the third signaling includes at least one of: RRC signaling, MAC CE signaling, or physical downlink control signaling.

In an optional embodiment, the parameters or parameter sets or resources may include at least one of: cyclic shift information, a frequency domain position, an uplink component carrier index, a bandwidth, a position of a frequency domain transmission comb, a time domain symbol position or index, a physical cell ID or a virtual cell ID for generating an uplink reference signal sequence, or an index number of a transmit beam.

In an optional embodiment, the uplink reference signal information may be indicated to the terminal through at least one of the following signalings: information for indicating a resource index of the uplink reference signal; information for indicating a transmit port of the uplink reference signal; information for indicating a precoding matrix index; information for indicating the resource index of the uplink reference signal and the precoding matrix index; or information for indicating a transmit beam index of the uplink reference signal. In the present embodiment, the above signaling is a relatively narrower term, and the uplink reference signal and other signals may be transmitted according to the above signaling.

In an optional embodiment, the method includes: determining, according to an uplink reference signal of a type 1 transmitted by the terminal, a transmission resource used by one or more uplink reference signals of a type 2, and indicating the transmission resource to the terminal through the signaling.

In an optional embodiment, the method includes: determining, according to an uplink reference signal of a type 1 transmitted by a terminal, one or more uplink reference signals of a type 2 based on a quasi-co-location (QCL) criterion or a beam consistency criterion; or a relationship between the uplink reference signal of the type 1 and an uplink reference signal of the type 2 being QCL or beam consistency.

In an optional embodiment, the method includes: determining, according to an uplink reference signal of a type 2 transmitted by the terminal, a transmission manner of at least one of the following information: uplink data, uplink control, downlink data, or downlink control.

In an optional embodiment, the step of indicating the uplink reference signal information to the terminal through the signaling may include at least one of: determining, according to an uplink reference signal of a type 1 transmitted by the terminal, one or more pieces of the information for indicating the resource index of the uplink reference signal, and notifying the information for indicating the resource index of the uplink reference signal to the terminal, where the information for indicating the resource index of the uplink reference signal is used for indicating the terminal to transmit at least one uplink reference signal of a type 2; determining, according to an uplink reference signal of the type 1 transmitted by the terminal, one or more pieces of the information for indicating the resource index of the uplink reference signal and the information for indicating the transmit port of the uplink reference signal, and indicating the information for indicating the resource index of the uplink reference signal and the information for indicating the transmit port of the uplink reference signal as signaling 1 to the terminal, where the signaling 1 is used for indicating the terminal to transmit at least one uplink reference signal of the type 2; or determining, according to an uplink reference signal of the type 1 transmitted by the terminal, one or more pieces of the information for indicating the resource index of the uplink reference signal and the information for indicating the precoding matrix index, and indicating the information for indicating the resource index of the uplink reference signal and the information for indicating the precoding matrix index as signaling 2 to the terminal, where the signaling 2 is used for indicating the terminal to transmit at least one uplink reference signal of the type 2.

In an optional embodiment, the uplink reference signal of the type 1 and/or the uplink reference signal of the type 2 is determined in at least one of the following manners: in a manner of agreement; in a manner of using the information for indicating the resource index of the uplink reference signal; in a manner indicated by the signaling 1; in a manner indicated by the signaling 2; or through a physical downlink control signaling. In the present embodiment, the above manner of agreement refers to that the terminal and the base station determine the uplink reference signal of the type 1 and/or the uplink reference signal of the type 2 in the manner of agreement. The agreement may be made only through the protocol or may be made in other ways. In addition, in the above manner of determining the uplink reference signal of the type 1 and/or the uplink reference signal of the type 2 through the signaling, determination may also be made through other signaling in the physical layer in addition to the signaling 1 and the signaling 2.

In an optional embodiment, the uplink reference signal of the type 1 and/or the uplink reference signal of the type 2 may includes at least one of: a wideband or full-bandwidth uplink reference signal; a non-precoded wideband or full-bandwidth uplink reference signal; a precoded wideband or full-bandwidth uplink reference signal; a non-precoded uplink reference signal; a wideband or full-bandwidth beamformed uplink reference signal; a narrowband or sub-band or partial-bandwidth uplink reference signal; a precoded narrowband or sub-band or partial-bandwidth uplink reference signal; a non-precoded narrowband or sub-band or partial-bandwidth uplink reference signal; a precoded uplink reference signal; a beamformed uplink reference signal; or a narrowband or sub-band or partial-bandwidth beamformed uplink reference signal.

In an optional embodiment, the information for indicating the resource index of the uplink reference signal includes at least one of: a transmit beam index, a time domain resource index of the uplink reference signal, a frequency domain resource index of the uplink reference signal, or a code domain resource index of the uplink reference signal.

In an optional embodiment, the cell ID used by the uplink reference signal and/or the virtual cell ID used by the uplink reference signal includes at least one of: different cell IDs used by the uplink reference signal in different segments; different virtual cell IDs used by the uplink reference signal in different segments; different cell IDs used by the uplink reference signal in different sub-bands; different virtual cell IDs used by the uplink reference signal in different sub-bands; different cell IDs used by the uplink reference signal in different bandwidths; or different virtual cell IDs used by the uplink reference signal in different bandwidths.

In an optional embodiment, a value of the cell ID and/or a value of the virtual cell ID is determined according to at least one of the following information: a starting resource block (RB) of a frequency domain resource of a segment or sub-band or bandwidth occupied by the uplink reference signal; an index of an end RB of the frequency domain resource of the segment or sub-band or bandwidth occupied by the uplink reference signal; a configured virtual cell ID; an index of a sub-band to which the segment or sub-band or bandwidth occupied by the uplink reference signal belongs; or a sorting number of the segment or sub-band or bandwidth occupied by the uplink reference signal.

In an optional embodiment, a manner of obtaining a sequence of the uplink reference signal or the cell ID used by the uplink reference signal or the virtual cell ID used by the uplink reference signal includes at least one of: (a physical cell ID or a configured virtual cell ID+a starting RB or an index of an end RB of a frequency domain resource of a segment or sub-band or bandwidth occupied by the uplink reference signal) mod 504; (the physical cell ID or the configured virtual cell ID+an index of a sub-band to which the segment or sub-band or bandwidth occupied by the uplink reference signal belongs) mod 504; (the physical cell ID or the configured virtual cell ID+a sorting number of the segment or sub-band or bandwidth occupied by the uplink reference signal) mod 504; the sorting number of the segment or sub-band or bandwidth occupied by the uplink reference signal; or configuring a virtual cell ID or a cell ID used by the uplink reference signal in each frequency domain segment through a physical layer signaling or a higher-layer signaling.

A method for indicating uplink reference signal information is provided in an embodiment. FIG. 3 is a flowchart of a method for transmitting an uplink reference signal according to the embodiment of the present disclosure. As shown in FIG. 3, the method includes the steps described below.

In S302, uplink reference signal information indicated by a base station through a signaling is received. The uplink reference signal information includes at least one of the following information: a transmission manner in which an uplink reference signal is transmitted, a transmission resource used for transmitting the uplink reference signal, a type of the transmitted uplink reference signal, a cell ID used by the uplink reference signal, or a virtual cell ID used by the uplink reference signal.

In S304, the uplink reference signal is transmitted according to the uplink reference signal information.

Through the above steps, the uplink reference signal information indicated by the base station through the signaling is received. The uplink reference signal information includes: information for indicating the transmission manner in which the uplink reference signal is transmitted, information for indicating the transmission resource used for transmitting the uplink reference signal, and information for indicating the type of the transmitted uplink reference signal. The terminal transmits the uplink reference signal according to the uplink reference signal information. Therefore, the problem in the existing art about transmitting the uplink reference signal can be solved, and the effect of implementing effective transmission of the uplink reference signal is achieved.

Optionally, the above steps may, and may not necessarily, be executed by a terminal (e.g., a mobile phone, a computer, etc.).

In an optional embodiment, the transmission manner may include at least one of: a transmit beam, a transmit antenna, a transmit sector, precoding at a transmitting end, a manner of indication through an antenna port, a manner of indication through an antenna weight vector, a manner of indication through an antenna weight matrix, a space division multiplexing mode, a manner of frequency domain/time domain transmission diversity, a transmission sequence, the number of transmission layers, a transmission mode, a modulation and coding scheme, a manner of indication through a reference signal index, a spatial domain transmission filter, or a spatial quasi-co-location.

In an optional embodiment, the transmission resource may include at least one of: a time domain resource, a frequency domain resource, a code domain resource, a beam domain resource, or an antenna port resource.

In an optional embodiment, the uplink reference signal information that may be indicated by the base station through at least one of the following signalings is received: RRC signaling; MAC CE signaling; or physical downlink control signaling.

In an optional embodiment, the uplink reference signal may include at least one of: a sounding reference signal, an uplink demodulation reference signal, an uplink phase compensation reference signal, or a reference signal for uplink beam scanning or uplink beam tracking or uplink beam selection.

In an optional embodiment, the type of the uplink reference signal includes at least one of: a wideband or full-bandwidth uplink reference signal, a narrowband or sub-band uplink reference signal, a non-precoded or precoded uplink reference signal, a wideband or full-bandwidth non-precoded uplink reference signal, a wideband or full-bandwidth precoded uplink reference signal, a narrowband or sub-band precoded uplink reference signal, a narrowband or sub-band non-precoded uplink reference signal, a beamformed uplink reference signal, a reference signal for uplink or downlink channel measurement, or a reference signal for uplink beam scanning or beam tracking or beam selection.

In an optional embodiment, the step of receiving the uplink reference signal information indicated by the base station through the signaling includes: receiving one or more sets of parameters or parameter sets or resources configured, by the base station and through at least one of a first signaling, a second signaling or a third signaling, for transmitting the uplink reference signal.

In an optional embodiment, the step of receiving the uplink reference signal information indicated by the base station through the signaling includes: receiving M sets of parameters or parameter sets or resources configured, by the base station and through a first signaling, for transmitting the uplink reference signal, where M is a positive integer; and receiving N sets of parameters or parameter sets or resources selected, by the base station and through a second signaling, from the M sets of parameters or parameter sets or resources, where N is a positive integer less than or equal to M.

In an optional embodiment, the step of receiving the uplink reference signal information indicated by the base station through the signaling includes: receiving K sets of parameters or parameter sets or resources used for configuring transmission of the uplink reference signal and selected, by the base station and through a third signaling, from the N sets of parameters or parameter sets or resources, where K is a positive integer less than or equal to N.

In an optional embodiment, any one of the first signaling, the second signaling and the third signaling includes at least one of: RRC signaling, MAC CE signaling, or physical downlink control signaling.

In an optional embodiment, the parameters or parameter sets or resources may include at least one of: cyclic shift information, a frequency domain position, an uplink component carrier index, a bandwidth, a position of a frequency domain transmission comb, a time domain symbol position or index, a physical cell ID or virtual cell ID for generating an uplink reference signal sequence, or an index number of a transmit beam.

In an optional embodiment, the uplink reference signal information that may be indicated by the base station through at least one of the following signalings is received: information for indicating a resource index of the uplink reference signal; information for indicating a transmit port of the uplink reference signal; information for indicating a precoding matrix index; information for indicating the resource index of the uplink reference signal and the precoding matrix index; or information for indicating a transmit beam index of the uplink reference signal.

In an optional embodiment, the uplink reference signal information determined by the base station in a following manner is received: determining, according to an uplink reference signal of a type 1 transmitted by a terminal, a transmission resource used by one or more uplink reference signals of a type 2.

In an optional embodiment, the uplink reference signal information determined by the base station in a following manner is received: determining, according to an uplink reference signal of a type 2 transmitted by the terminal, a transmission manner of at least one of the following information: uplink data, uplink control, downlink data or downlink control.

In an optional embodiment, the step of transmitting the uplink reference signal according to the reference signal information may include at least one of: receiving one or more pieces of information used for indicating a resource index of the uplink reference signal and determined by the base station according to a received uplink reference signal of a type 1, and transmitting at least one uplink reference signal of a type 2 according to the information of the resource index of the uplink reference signal; receiving signaling 1 from the base station, where the signaling 1 includes one or more pieces of information used for indicating the resource index of the uplink reference signal and indicating a transmit port of the uplink reference signal and determined by the base station according to a received uplink reference signal of the type 1, and transmitting at least one uplink reference signal of the type 2 according to the signaling 1; or receiving signaling 2 from the base station, where the signaling 2 includes one or more pieces of information used for indicating the resource index of the uplink reference signal and indicating a precoding matrix index and determined by the base station according to a received uplink reference signal of the type 1, and transmitting at least one uplink reference signal of the type 2 according to the signaling 2.

In an optional embodiment, the uplink reference signal of the type 1 and/or the uplink reference signal of the type 2 may be determined in at least one of the following manners: in a manner of agreement; in a manner of using the information for indicating the resource index of the uplink reference signal; in a manner indicated by the signaling 1; in a manner indicated by the signaling 2; or through a physical downlink control signaling.

In an optional embodiment, the uplink reference signal of the type 1 and/or the uplink reference signal of the type 2 may include at least one of: a non-precoded wideband or full-bandwidth uplink reference signal; a precoded wideband or full-bandwidth uplink reference signal; a non-precoded uplink reference signal; a wideband or full-bandwidth beamformed uplink reference signal; a narrowband or sub-band or partial-bandwidth uplink reference signal; a precoded narrowband or sub-band or partial-bandwidth uplink reference signal; a non-precoded narrowband or sub-band or partial-bandwidth uplink reference signal; a precoded uplink reference signal; a beamformed uplink reference signal; or a narrowband or sub-band or partial-bandwidth beamformed uplink reference signal.

In an optional embodiment, the information for indicating the resource index of the uplink reference signal includes at least one of: a transmit beam index, a time domain resource index of the uplink reference signal, a frequency domain resource index of the uplink reference signal, or a code domain resource index of the uplink reference signal.

In an optional embodiment, the cell ID used by the uplink reference signal and/or the virtual cell ID used by the uplink reference signal includes at least one of: different cell IDs used by the uplink reference signal in different segments; different virtual cell IDs used by the uplink reference signal in different segments; different cell IDs used by the uplink reference signal in different sub-bands; different virtual cell IDs used by the uplink reference signal in different sub-bands; different cell IDs used by the uplink reference signal in different bandwidths; or different virtual cell IDs used by the uplink reference signal in different bandwidths.

In an optional embodiment, a value of the cell ID or a value of the virtual cell ID includes at least one of the following information: a starting RB of a frequency domain resource of a segment or sub-band or bandwidth occupied by the uplink reference signal; an index of an end RB of the frequency domain resource of the segment or sub-band or bandwidth occupied by the uplink reference signal; a configured virtual cell ID; an index of a sub-band to which the segment or sub-band or bandwidth occupied by the uplink reference signal belongs; and a sorting number of the segment or sub-band or bandwidth occupied by the uplink reference signal.

In an optional embodiment, a manner of obtaining a sequence of the uplink reference signal or the cell ID used by the uplink reference signal or the virtual cell ID used by the uplink reference signal includes at least one of: (a physical cell ID or a configured virtual cell ID+a starting RB or an index of an end RB of a frequency domain resource of a segment or sub-band or bandwidth occupied by the uplink reference signal) mod 504; (the physical cell ID or the configured virtual cell ID+an index of a sub-band to which the segment or sub-band or bandwidth occupied by the uplink reference signal belongs) mod 504; (the physical cell ID or the configured virtual cell ID+a sorting number of the segment or sub-band or bandwidth occupied by the uplink reference signal) mod 504; the sorting number of the segment or sub-band or bandwidth occupied by the uplink reference signal; or configuring a virtual cell ID or a cell ID used by the uplink reference signal in each frequency domain segment through a physical layer signaling or a higher-layer signaling. In the present embodiment, the higher layer information may be signaling of a layer above the physical layer, for example, RRC signaling of the RRC layer, MAC layer signaling of the MAC layer, and so on.

A method for transmitting uplink reference signal information is provided in an embodiment. The method includes: generating uplink reference signals in a manner agreed with a base station, where the uplink reference signals are generated in different frequency domain segments or different frequency domain sub-bands or different bandwidths by using different cell IDs or virtual cell IDs; and transmitting the generated uplink reference signals to the base station.

In an optional embodiment, a value of the cell ID or a value of the virtual cell ID is determined through at least one of the following information: a starting RB of a frequency domain resource of a frequency domain segment or sub-band or bandwidth occupied by each of the uplink reference signals, an index of an end RB of the frequency domain resource of the frequency domain segment or sub-band or bandwidth occupied by the each of the uplink reference signals, a configured virtual cell ID, an index of a sub-band to which the frequency domain segment or sub-band or bandwidth occupied by the each of the uplink reference signals belongs; and a sorting number of the frequency domain segment or sub-band or bandwidth occupied by the each of the uplink reference signals.

In an optional embodiment, a manner of obtaining a base sequence of each of the uplink reference signals or a cell ID used by the each of the uplink reference signals or a virtual cell ID used by the each of the uplink reference signals includes at least one of: (a physical cell ID or a configured virtual cell ID+a starting RB or an index of an end RB of a frequency domain resource of a frequency domain segment or sub-band or bandwidth occupied by the each of the uplink reference signals) mod 504; (the physical cell ID or the configured virtual cell ID+an index of a sub-band to which the frequency domain segment or sub-band or bandwidth occupied by the each of the uplink reference signals belongs) mod 504; (the physical cell ID or the configured virtual cell ID+a sorting number of the frequency domain segment or sub-band or bandwidth occupied by the each of the uplink reference signals) mod 504; the sorting number of the frequency domain segment or sub-band or bandwidth occupied by the each of the uplink reference signals; or configuring a virtual cell ID or a cell ID used by the each of the uplink reference signals in each frequency domain segment through physical layer signaling or higher-layer signaling.

In an optional embodiment, the uplink reference signal includes at least one of: a sounding reference signal, an uplink demodulation reference signal, an uplink phase compensation reference signal, or a reference signal for uplink beam scanning or uplink beam tracking or uplink beam selection.

The present disclosure will be described below in detail in conjunction with optional examples.

OPTIONAL EXAMPLE 1

A base station indicates, through a signaling, a transmission manner or a resource used by a terminal to transmit an uplink reference signal. The uplink reference signal includes at least one of: a measurement/sounding reference signal, an uplink demodulation reference signal, an uplink phase compensation reference signal, a reference signal for uplink or downlink channel measurement, or a reference signal for uplink beam scanning/beam tracking/beam selection.

The transmission manner includes at least one of: a transmit beam, a transmit antenna, a transmit sector, precoding at a transmitting end, a manner indicated by an antenna port, a manner indicated by an antenna weight vector, a manner indicated by an antenna weight matrix, a space division multiplexing mode, a manner of frequency domain/time domain transmission diversity, a transmission sequence, the number of transmission layers, a transmission mode, a modulation and coding scheme, a manner indicated by a reference signal index, a spatial domain transmission filter, or a spatial quasi-co-location.

The resource includes at least one of: a time domain resource, a frequency domain resource or a code domain resource.

The signaling includes at least one of: RRC signaling, MAC CE signaling or physical downlink control signaling.

Preferably, the base station configures M sets of parameters or parameter sets or resources for the uplink reference signal of the terminal through the RRC signaling, selects N sets from the M sets of parameters or parameter sets or resources through the MAC CE signaling, and selects one set of parameters or parameter sets or resources from the N sets of parameters or parameter sets or resources through the physical downlink control signaling for configuring transmission of the uplink reference signal. M is an integer between 1 and 100 (corresponding to M being a positive integer described above), and the N is an integer less than or equal to M.

The parameters or parameter sets or resources include at least one of: cyclic shift information, a frequency domain position, an uplink component carrier index, a bandwidth, a position of a frequency domain transmission comb, a time domain symbol position or index, a physical cell ID or virtual cell ID for generating an uplink reference signal sequence, or an index number of a transmit beam.

For example, the base station configures 10 sets of parameter sets or resources for the terminal through the RRC signaling, and selects or activates 3 sets from the 10 sets of parameter sets or resources through the MAC CE signaling, and indicates, through a 2-bit downlink control signaling, whether to trigger the uplink reference signal and which set of parameter sets or resources to select in case of triggering, as listed in table 1.

TABLE 1

| Value of an SRS request domain | Description |
| --- | --- |
| 00 | Not triggering the SRS |
| 01 | Triggering the SRS and using an SRS parameter set 1 |

TABLE 1-continued

| Value of an SRS request domain | Description |
| --- | --- |
| 10 | Triggering the SRS and using an SRS parameter set 2 |
| 11 | Triggering the SRS and using an SRS parameter set 3 |

OPTIONAL EXAMPLE 2

A base station configures multiple sets of resources of an uplink reference signal of a type 1 for a terminal, and the terminal transmits multiple uplink reference signals of the type 1 on the resources. The base station determines, based on the received uplink reference signals of the type 1, information for indicating resource indexes of the uplink reference signals and notifies the terminal of the information. The terminal forms one or more uplink reference signals of a type 2 based on the received information of the resource indexes of the uplink reference signals. The uplink reference signal of the type 1 includes at least one of: a wideband or full-bandwidth uplink reference signal, a wideband or full-bandwidth non-precoded uplink reference signal, a non-precoded uplink reference signal, or a wideband or full-bandwidth beamformed uplink reference signal.

The uplink reference signal of the type 2 includes at least one of: a narrowband or sub-band uplink reference signal, a narrowband or sub-band precoded uplink reference signal, a precoded uplink reference signal, a non-precoded uplink reference signal, a beamformed uplink reference signal, or a narrowband or sub-band or partial-bandwidth beamformed uplink reference signal.

OPTIONAL EXAMPLE 3

A base station configures multiple sets of resources of an uplink reference signal of a type 1 for a terminal, and the terminal transmits multiple uplink reference signals of the type 1 on the resources. The base station determines, based on the received uplink reference signals of the type 1, information for indicating resource indexes of the uplink reference signals and information for indicating transmit ports of the uplink reference signals and indicates the information to the terminal through a signaling. The terminal forms one or more uplink reference signals of a type 2 based on the received signaling.

The information for indicating the transmit ports of the uplink reference signals may be indicated by a precoding matrix indicator (PMI) of a port selected codebook, or may be indicated implicitly by different frequency domain or code domain or time domain resources.

The uplink reference signal of the type 1 includes at least one of: a wideband or full-bandwidth uplink reference signal, a wideband or full-bandwidth non-precoded uplink reference signal, a non-precoded uplink reference signal, or a wideband or full-bandwidth beamformed uplink reference signal.

The uplink reference signal of the type 2 includes at least one of: a narrowband or sub-band uplink reference signal, a narrowband or sub-band precoded uplink reference signal, a precoded uplink reference signal, a non-precoded uplink reference signal, a beamformed uplink reference signal, or a narrowband or sub-band or partial-bandwidth beamformed uplink reference signal.

OPTIONAL EXAMPLE 4

A base station configures multiple sets of resources of an uplink reference signal of a type 1 for a terminal, and the terminal transmits multiple uplink reference signals of the type 1 on the resources. The base station determines, based on the received uplink reference signals of the type 1, information for indicating resource indexes of the uplink reference signals and information for indicating a precoding matrix index or determines information for indicating transmit beam indexes of the uplink reference signals, and indicates the information to the terminal through a signaling. The terminal forms one or more uplink reference signals of a type 2 based on the received signaling.

The information for indicating the precoding matrix index may be used for precoding of the uplink reference signals, and may also be used for precoding of uplink data.

The uplink reference signal of the type 1 includes at least one of: a wideband or full-bandwidth uplink reference signal, a wideband or full-bandwidth non-precoded uplink reference signal, a non-precoded uplink reference signal, or a wideband or full-bandwidth beamformed uplink reference signal.

The uplink reference signal of the type 2 includes at least one of: a narrowband or sub-band uplink reference signal, a narrowband or sub-band precoded uplink reference signal, a precoded uplink reference signal, a non-precoded uplink reference signal, a beamformed uplink reference signal, or a narrowband or sub-band or partial-bandwidth beamformed uplink reference signal.

In summary, the above embodiments can solve the problem of how a UE transmits wideband and narrowband SRSs, a precoded SRS and a non-precoded SRS, and can solve the problem of how to determine a transmit beam of the SRS.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided in the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to embodiments of the present disclosure.

An apparatus for indicating uplink reference signal information is further provided in an embodiment. The apparatus is configured to implement the above-mentioned embodiments and preferred embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

FIG. 4 is a structural block diagram of an apparatus for indicating uplink reference signal information according to the embodiment of the present disclosure. As shown in FIG. 4, the apparatus includes an indication module 42, and is described below in detail.

The indication module 42 is configured to indicate uplink reference signal information to a terminal through signaling. The uplink reference signal information includes at least one of the following information: information for indicating a transmission manner in which the terminal transmits an uplink reference signal, information for indicating a transmission resource used by the terminal to transmit the uplink reference signal, information for indicating a type of the uplink reference signal transmitted by the terminal, a cell ID used by the uplink reference signal, or a virtual cell ID used by the uplink reference signal.

In an optional embodiment, the transmission manner may include at least one of: a transmit beam, a transmit antenna, a transmit sector, precoding at a transmitting end, a manner indicated by an antenna port, a manner indicated by an antenna weight vector, a manner indicated by an antenna weight matrix, a space division multiplexing mode, a manner of frequency domain/time domain transmission diversity, a transmission sequence, the number of transmission layers, a transmission mode, a modulation and coding scheme, a manner indicated by a reference signal index, a spatial domain transmission filter, or a spatial quasi-co-location.

In an optional embodiment, the transmission resource may include at least one of: a time domain resource, a frequency domain resource, a code domain resource, a beam domain resource, or an antenna port resource.

In an optional embodiment, the apparatus may indicate the uplink reference signal information to the terminal through at least one of the following signalings: RRC signaling; MAC CE signaling; or physical downlink control signaling.

In an optional embodiment, the uplink reference signal may include at least one of: a sounding reference signal, an uplink demodulation reference signal, an uplink phase compensation reference signal, or a reference signal for uplink beam scanning or uplink beam tracking or uplink beam selection.

In an optional embodiment, the type of the uplink reference signal may include at least one of: a wideband or full-bandwidth uplink reference signal, a narrowband or sub-band uplink reference signal, a non-precoded or pre-coded uplink reference signal, a wideband or full-bandwidth non-precoded uplink reference signal, a wideband or full-bandwidth precoded uplink reference signal, a narrowband or sub-band precoded uplink reference signal, a narrowband or sub-band non-precoded uplink reference signal, a beam-formed uplink reference signal, a reference signal for uplink or downlink channel measurement, or a reference signal for uplink beam scanning or beam tracking or beam selection.

In an optional embodiment, the step of indicating the uplink reference signal information to the terminal through the signaling includes: configuring, through at least one of a first signaling, a second signaling or a third signaling, one or more sets of parameters or parameter sets or resources for the terminal to transmit the uplink reference signal.

Figure 5:
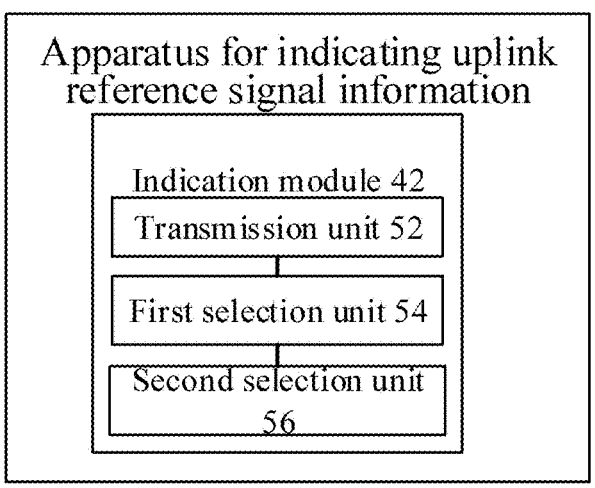
FIG. 5 is a structural block diagram illustrating an indication module 42 of an apparatus for indicating uplink reference signal information according to an embodiment of the present disclosure.

In an optional embodiment, FIG. 5 is a structural block diagram illustrating the indication module 42 of an apparatus for indicating uplink reference signal information according to an embodiment of the present disclosure. As shown in FIG. 5, the indication module 42 includes: a transmission unit 52, a first selection unit 54 and a second selection unit 56. The indication module 42 is described below in detail.

The transmission unit 52 is configured to configure, through a first signaling, M sets of parameters or parameter sets or resources for the terminal to transmit the uplink reference signal, where M is a positive integer. The first selection unit 54 is connected to the transmission unit 52 and is configured to select, through a second signaling, N sets of parameters or parameter sets or resources from the M sets of parameters or parameter sets or resources, where N is a positive integer less than or equal to M. The second selection unit 56 is connected to the first selection unit 54 and is configured to select, through a third signaling, K sets of parameters or parameter sets or resources from the N sets of parameters or parameter sets or resources to configure transmission of the uplink reference signal, where K is a positive integer less than or equal to N.

In an optional embodiment, at least one of the first signaling, the second signaling or the third signaling includes at least one of: RRC signaling, MAC CE signaling, or physical downlink control signaling.

In an optional embodiment, the parameters or parameter sets or resources may include at least one of: cyclic shift information, a frequency domain position, an uplink component carrier index, a bandwidth, a position of a frequency domain transmission comb, a time domain symbol position or index, a physical cell ID or virtual cell ID for generating an uplink reference signal sequence, or an index number of a transmit beam.

In an optional embodiment, the apparatus may indicate the uplink reference signal information to the terminal through at least one of the following signalings: information for indicating a resource index of the uplink reference signal; information for indicating a transmit port of the uplink reference signal; information for indicating a precoding matrix index; information for indicating the resource index of the uplink reference signal and the precoding matrix index; or information for indicating a transmit beam index of the uplink reference signal.

In an optional embodiment, the apparatus determines, according to an uplink reference signal of a type 1 transmitted by the terminal, a transmission resource used by one or more uplink reference signals of a type 2, and indicates the transmission resource to the terminal through the signaling.

In an optional embodiment, the apparatus determines, according to an uplink reference signal of the type 1 transmitted by a terminal, one or more uplink reference signals of the type 2 based on a QCL criterion or a beam consistency criterion; or a relationship between the uplink reference signal of the type 1 and an uplink reference signal of the type 2 is QCL or beam consistency.

In an optional embodiment, the apparatus determines, according to an uplink reference signal of the type 2 transmitted by the terminal, a transmission manner of at least one of the following information: uplink data, uplink control, downlink data, or downlink control.

In an optional embodiment, the apparatus may indicate the uplink reference signal information to the terminal in at least one of the following manners: determining, according to the uplink reference signal of the type 1 transmitted by the terminal, one or more pieces of the information for indicating the resource index of the uplink reference signal, and notifying the information for indicating the resource index of the uplink reference signal to the terminal, where the information for indicating the resource index of the uplink reference signal is used for indicating the terminal to transmit at least one uplink reference signal of the type 2; determining, according to the uplink reference signal of the type 1 transmitted by the terminal, one or more pieces of the information for indicating the resource index of the uplink reference signal and the information for indicating the transmit port of the uplink reference signal, and indicating the information for indicating the resource index of the uplink reference signal and the information for indicating the transmit port of the uplink reference signal as signaling 1 to the terminal, where the signaling 1 is used for indicating the terminal to transmit at least one uplink reference signal of the type 2; or determining, according to the uplink reference signal of the type 1 transmitted by the terminal, one or more pieces of the information for indicating the resource index of the uplink reference signal and the information for indicating the precoding matrix index, and indicating the information for indicating the resource index of the uplink reference signal and the information for indicating the precoding matrix index as signaling 2 to the terminal, where the signaling 2 is used for indicating the terminal to transmit at least one uplink reference signal of the type 2.

In an optional embodiment, the uplink reference signal of the type 1 and/or the uplink reference signal of the type 2 may be determined in at least one of the following manners: in a manner of agreement; in a manner of using the information for indicating the resource index of the uplink reference signal; in a manner indicated by the signaling 1; in a manner indicated by the signaling 2; or through a physical downlink control signaling.

In an optional embodiment, the uplink reference signal of the type 1 and/or the uplink reference signal of the type 2 may include at least one of: a non-precoded wideband or full-bandwidth uplink reference signal; a precoded wideband or full-bandwidth uplink reference signal; a non-precoded uplink reference signal; a wideband or full-bandwidth beamformed uplink reference signal; a narrowband or sub-band or partial-bandwidth uplink reference signal; a precoded narrowband or sub-band or partial-bandwidth uplink reference signal; a non-precoded narrowband or sub-band or partial-bandwidth uplink reference signal; a precoded uplink reference signal; a beamformed uplink reference signal; or a narrowband or sub-band or partial-bandwidth beamformed uplink reference signal.

In an optional embodiment, the information for indicating the resource index of the uplink reference signal includes at least one of: a transmit beam index, a time domain resource index of the uplink reference signal, a frequency domain resource index of the uplink reference signal, or a code domain resource index of the uplink reference signal.

In an optional embodiment, the cell ID used by the uplink reference signal and/or the virtual cell ID used by the uplink reference signal include at least one of: different cell IDs used by the uplink reference signal in different segments; different virtual cell IDs used by the uplink reference signal in different segments; different cell IDs used by the uplink reference signal in different sub-bands; different virtual cell IDs used by the uplink reference signal in different sub-bands; different cell IDs used by the uplink reference signal in different bandwidths; or different virtual cell IDs used by the uplink reference signal in different bandwidths.

In an optional embodiment, a value of the cell ID and/or a value of the virtual cell ID is determined according to at least one of the following information: a starting RB of a frequency domain resource of a segment or sub-band or bandwidth occupied by the uplink reference signal; an index of an end RB of the frequency domain resource of the segment or sub-band or bandwidth occupied by the uplink reference signal; a configured virtual cell ID; an index of a sub-band to which the segment or sub-band or bandwidth occupied by the uplink reference signal belongs; or a sorting number of the segment or sub-band or bandwidth occupied by the uplink reference signal.

In an optional embodiment, a manner of obtaining a sequence of the uplink reference signal or the cell ID used by the uplink reference signal or the virtual cell ID used by the uplink reference signal includes at least one of: (a physical cell ID or a configured virtual cell ID+a starting RB or an index of an end RB of a frequency domain resource of a segment or sub-band or bandwidth occupied by the uplink reference signal) mod 504; (the physical cell ID or the configured virtual cell ID+an index of a sub-band to which the segment or sub-band or bandwidth occupied by the uplink reference signal belongs) mod 504; (the physical cell ID or the configured virtual cell ID+a sorting number of the segment or sub-band or bandwidth occupied by the uplink reference signal) mod 504; the sorting number of the segment or sub-band or bandwidth occupied by the uplink reference signal; or configuring a virtual cell ID or a cell ID used by the uplink reference signal in each frequency domain segment through a physical layer signaling or a higher-layer signaling.

Figure 6:
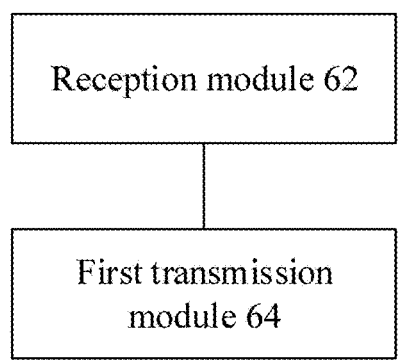
FIG. 6 is a structural block diagram of an apparatus for transmitting an uplink reference signal according to an embodiment of the present disclosure.

FIG. 6 is a structural block diagram of an apparatus for transmitting an uplink reference signal according to an embodiment of the present disclosure. As shown in FIG. 6, the apparatus includes a reception module 62 and a first transmission module 64, and is described below in detail.

The reception module 62 is configured to receive uplink reference signal information indicated by a base station through a signaling. The uplink reference signal information includes at least one of the following information: a transmission manner in which an uplink reference signal is transmitted, a transmission resource used for transmitting the uplink reference signal, a type of the transmitted uplink reference signal, a cell ID used by the uplink reference signal, and a virtual cell ID used by the uplink reference signal. The first transmission module 64 is connected to the reception module 62 and is configured to transmit the uplink reference signal according to the uplink reference signal information.

In an optional embodiment, the transmission manner may include at least one of: a transmit beam, a transmit antenna, a transmit sector, precoding at a transmitting end, a manner indicated by an antenna port, a manner indicated by an antenna weight vector, a manner indicated by an antenna weight matrix, a space division multiplexing mode, a manner of frequency domain/time domain transmission diversity, a transmission sequence, the number of transmission layers, a transmission mode, a modulation and coding scheme, a manner indicated by a reference signal index, a spatial domain transmission filter, or a spatial quasi-co-location.

In an optional embodiment, the transmission resource may include at least one of: a time domain resource, a frequency domain resource, a code domain resource, a beam domain resource, or an antenna port resource.

In an optional embodiment, the apparatus may receive the uplink reference signal information indicated by the base station through at least one of the following signaling: RRC signaling; MAC CE signaling; or physical downlink control signaling.

In an optional embodiment, the uplink reference signal may include at least one of: a sounding reference signal, an uplink demodulation reference signal, an uplink phase compensation reference signal, or a reference signal for uplink beam scanning or uplink beam tracking or uplink beam selection.

In an optional embodiment, the type of the uplink reference signal includes at least one of: a wideband or full-bandwidth uplink reference signal, a narrowband or sub-band uplink reference signal, a non-precoded or precoded uplink reference signal, a wideband or full-bandwidth non-precoded uplink reference signal, a wideband or full-bandwidth precoded uplink reference signal, a narrowband or sub-band precoded uplink reference signal, a narrowband or sub-band non-precoded uplink reference signal, a beamformed uplink reference signal, a reference signal for uplink or downlink channel measurement, or a reference signal for uplink beam scanning or beam tracking or beam selection.

In an optional embodiment, the step in which the apparatus indicates the uplink reference signal information to the terminal through the signaling includes: configuring, through a first signaling and/or a second signaling and/or a third signaling, one or more sets of parameters or parameter sets or resources for the terminal to transmit the uplink reference signal.

In an optional embodiment, the step in which the apparatus indicates the uplink reference signal information to the terminal through the signaling includes: configuring, through the first signaling, M sets of parameters or parameter sets or resources for the terminal to transmit the uplink reference signal, where M is a positive integer; and selecting, through the second signaling, N sets of parameters or parameter sets or resources from the M sets of parameters or parameter sets or resources, where N is a positive integer less than or equal to M.

In an optional embodiment, the step in which the apparatus indicates the uplink reference signal information to the terminal through the signaling includes: selecting, through the third signaling, K sets of parameters or parameter sets or resources from the N sets of parameters or parameter sets or resources to configure transmission of the uplink reference signal, where K is a positive integer less than or equal to N.

In an optional embodiment, any one of the first signaling, the second signaling and the third signaling includes at least one of: RRC signaling, MAC CE signaling, or physical downlink control signaling.

In an optional embodiment, the parameters or parameter sets or resources may include at least one of: cyclic shift information, a frequency domain position, an uplink component carrier index, a bandwidth, a position of a frequency domain transmission comb, a time domain symbol position or index, a physical cell ID or virtual cell ID for generating an uplink reference signal sequence, or an index number of a transmit beam.

In an optional embodiment, the apparatus may receive the uplink reference signal information indicated by the base station in at least one of the following signalings: information for indicating a resource index of the uplink reference signal; information for indicating a transmit port of the uplink reference signal; information for indicating a precoding matrix index; information for indicating the resource index of the uplink reference signal and the precoding matrix index; or information for indicating a transmit beam index of the uplink reference signal.

In an optional embodiment, it is included that the apparatus determines, according to an uplink reference signal of a type 1 transmitted by the terminal, a transmission resource used by one or more uplink reference signals of a type 2, and indicates the transmission resource to the terminal through the above signaling.

In an optional embodiment, it is included that the apparatus determines, according to the uplink reference signal of the type 1 transmitted by a terminal, one or more uplink reference signals of the type 2 based on a QCL criterion or a beam consistency criterion; or a relationship between the uplink reference signal of the type 1 and an uplink reference signal of the type 2 is QCL or beam consistency.

In an optional embodiment, it is included that the apparatus determines, according to the uplink reference signal of the type 2 transmitted by the terminal, a transmission manner of at least one of the following information: uplink data, uplink control, downlink data, or downlink control.

In an optional embodiment, the first transmission module 64 may transmit the uplink reference signal according to the reference signal information in at least one of the following manners: receiving one or more pieces of information used for indicating a resource index of the uplink reference signal and determined by the base station according to a received uplink reference signal of the type 1, and transmitting at least one uplink reference signal of the type 2 according to the information of the resource index of the uplink reference signal; receiving signaling 1 from the base station, where the signaling 1 includes one or more pieces of information used for indicating the resource index of the uplink reference signal and indicating a transmit port of the uplink reference signal and determined by the base station according to the received uplink reference signal of the type 1, and transmitting the at least one uplink reference signal of the type 2 according to the signaling 1; or receiving signaling 2 from the base station, where the signaling 2 includes one or more pieces of information used for indicating the resource index of the uplink reference signal and indicating a precoding matrix index and determined by the base station according to the received uplink reference signal of the type 1, and transmitting the at least one uplink reference signal of the type 2 according to the signaling 2.

In an optional embodiment, the uplink reference signal of the type 1 and/or the uplink reference signal of the type 2 may be determined in at least one of the following manners: in a manner of agreement; in a manner of using the information for indicating the resource index of the uplink reference signal; in a manner indicated by the signaling 1; in a manner indicated by the signaling 2; or through a physical downlink control signaling.

In an optional embodiment, the uplink reference signal of the type 1 and/or the uplink reference signal of the type 2 may include at least one of: a non-precoded wideband or full-bandwidth uplink reference signal; a precoded wideband or full-bandwidth uplink reference signal; a non-precoded uplink reference signal; a wideband or full-bandwidth beamformed uplink reference signal; a narrowband or sub-band or partial-bandwidth uplink reference signal; a precoded narrowband or sub-band or partial-bandwidth uplink reference signal; a non-precoded narrowband or sub-band or partial-bandwidth uplink reference signal; a precoded uplink reference signal; a beamformed uplink reference signal; or a narrowband or sub-band or partial-bandwidth beamformed uplink reference signal.

In an optional embodiment, the information for indicating the resource index of the uplink reference signal includes at least one of: a transmit beam index, a time domain resource index of the uplink reference signal, a frequency domain resource index of the uplink reference signal, or a code domain resource index of the uplink reference signal.

In an optional embodiment, the cell ID used by the uplink reference signal and/or the virtual cell ID used by the uplink reference signal include at least one of: different cell IDs used by the uplink reference signal in different segments; different virtual cell IDs used by the uplink reference signal in different segments; different cell IDs used by the uplink reference signal in different sub-bands; different virtual cell IDs used by the uplink reference signal in different sub-bands; different cell IDs used by the uplink reference signal in different bandwidths; or different virtual cell IDs used by the uplink reference signal in different bandwidths.

In an optional embodiment, a value of the cell ID and/or a value of the virtual cell ID is determined according to at least one of the following information: a starting RB of a frequency domain resource of a segment or sub-band or bandwidth occupied by the uplink reference signal; an index of an end RB of the frequency domain resource of the segment or sub-band or bandwidth occupied by the uplink reference signal; a configured virtual cell ID; an index of a sub-band to which the segment or sub-band or bandwidth occupied by the uplink reference signal belongs; and a sorting number of the segment or sub-band or bandwidth occupied by the uplink reference signal.

In an optional embodiment, a manner of obtaining a sequence of the uplink reference signal or the cell ID used by the uplink reference signal or the virtual cell ID used by the uplink reference signal includes at least one of: (a physical cell ID or a configured virtual cell ID+a starting RB or an index of an end RB of a frequency domain resource of a segment or sub-band or bandwidth occupied by the uplink reference signal) mod 504; (the physical cell ID or the configured virtual cell ID+an index of a sub-band to which the segment or sub-band or bandwidth occupied by the uplink reference signal belongs) mod 504; (the physical cell ID or the configured virtual cell ID+a sorting number of the segment or sub-band or bandwidth occupied by the uplink reference signal) mod 504; the sorting number of the segment or sub-band or bandwidth occupied by the uplink reference signal; or configuring a virtual cell ID or a cell ID used by the uplink reference signal in each frequency domain segment through a physical layer signaling or a higher-layer signaling.

Another embodiment of the present disclosure further provides an apparatus for transmitting an uplink reference signal. The apparatus includes: a generation module, which is configured to generate uplink reference signals in a manner agreed with a base station, where the uplink reference signals are generated in different frequency domain segments or different frequency domain sub-bands or different bandwidths by using different cell IDs or virtual cell IDs; and a second transmission module, which is configured to transmit the generated uplink reference signals to the base station.

In an optional embodiment, a value of the cell ID or a value of the virtual cell ID is determined through at least one of the following information: a starting RB of a frequency domain resource of a frequency domain segment or sub-band or bandwidth occupied by each of the uplink reference signals, an index of an end RB of the frequency domain resource of the frequency domain segment or sub-band or bandwidth occupied by the each of the uplink reference signals, a configured virtual cell ID, an index of a sub-band to which the frequency domain segment or sub-band or bandwidth occupied by the each of the uplink reference signals belongs; and a sorting number of the frequency domain segment or sub-band or bandwidth occupied by the each of the uplink reference signals.

In an optional embodiment, the uplink reference signal includes at least one of: a sounding reference signal, an uplink demodulation reference signal, an uplink phase compensation reference signal, or a reference signal for uplink beam scanning or uplink beam tracking or uplink beam selection.

Another embodiment of the present disclosure further provides a storage medium. The storage medium is configured to store computer-executable instructions which may be used for executing the method for indicating uplink reference signal information provided by one or more of the above-mentioned technical solutions, or executing the method for transmitting an uplink reference signal provided by one or more of the above-mentioned technical solutions. For example, the storage medium may store program codes or application programs, and the program codes or the application programs may be used for performing the above steps.

Optionally, the storage medium is further configured to store program codes for performing a step described below.

Through the embodiments of the present disclosure, the uplink reference signal information is indicated to the terminal through the signaling. The uplink reference signal information includes: the transmission manner in which the terminal transmits an uplink reference signal, the transmission resource used by the terminal to transmit the uplink reference signal, the type of the uplink reference signal transmitted by the terminal, the cell ID used by the uplink reference signal, and the virtual cell ID used by the uplink reference signal. That is, the terminal transmits the uplink reference information according to the uplink reference signal information. Therefore, the problem in the existing art about transmitting the uplink reference signal can be solved, and the effect of implementing effective transmission of the uplink reference signal is achieved.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the solutions provided in the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the methods according to embodiments of the present disclosure.

The storage medium provided by the present embodiment may be a non-transitory storage medium.

It is to be noted that the various modules described above may be implemented by software or hardware. Implementation by hardware may, but may not necessarily, be performed in the following manners: the various modules described above are located in a same processor, or the various modules described above are located in their respective processors in any combination form. The processor may be an application processor (AP), a central processing unit (CPU), a digital signal processor (DSP), a field programmable gate array (FPGA), an application specific integrated circuit, or the like.

An embodiment of the present disclosure further provides a storage medium. Optionally, in the present embodiment, the storage medium may be configured to store program codes for performing the steps described above.

Optionally, in the present embodiment, the storage medium may include, but is not limited to, a USB flash disk, a read-only memory (ROM), a random access memory (RAM), a mobile hard disk, a magnetic disk, an optical disk or another medium capable of storing the program codes.

Optionally, in the present embodiment, a processor executes codes of the steps described above according to the program codes stored in the storage medium.

Optionally, for specific examples in the present embodiment, reference may be made to the examples described in the above-mentioned embodiments and optional embodiments, and repetition will not be made in the present embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, modifications made in accordance with the principles of the present disclosure should be understood as falling within the scope of the present disclosure.

INDUSTRIAL APPLICABILITY

The embodiments of the present disclosure change the manner in which the receiving end directly and regularly receives the SRS on the last data symbol of the transmission subframe in the existing art. The transmission parameter of the SRS, such as the transmission resource, the signal type and the like, is indicated to the transmitting end through the uplink reference signal information before the SRS needs to be received. On one hand, compared with fixedly receiving the SRS on the preset transmission subframe, the method in the present disclosure improves the flexibility of SRS transmission, and on the other hand, ensures the success rate of SRS transmission, thereby having positive industrial effects. Meanwhile, a transmitting end can be informed of the transmission parameter of the SRS through transmission of the uplink reference signal information to a transmitting end, so the method in the present disclosure is characterized by simple and convenient implementation, and can be applied in large scale in industry.

What is claimed is:

1. A method for indicating uplink reference signal information, comprising:
    indicating the uplink reference signal information to a terminal through a signaling, wherein the uplink reference signal information comprises at least one of following information: information for indicating a transmission manner in which the terminal transmits an uplink reference signal, information for indicating a transmission resource used by the terminal to transmit the uplink reference signal, information for indicating a type of the uplink reference signal transmitted by the terminal, a cell identifier (ID) used by the uplink reference signal, or a virtual cell ID used by the uplink reference signal;
    wherein indicating the uplink reference signal information to the terminal through the signaling comprises:
    configuring, through a first signaling, M sets of parameters or parameter sets or resources for the terminal to transmit the uplink reference signal, wherein M is a positive integer; and
    selecting, through a second signaling, N sets of parameters or parameter sets or resources from the M sets of parameters or parameter sets or resources, wherein N is a positive integer less than or equal to M.

2. The method of claim 1, wherein the transmission manner comprises at least one of:
    a transmit beam, a transmit antenna, a transmit sector, precoding at a transmitting end, a manner indicated by an antenna port, a manner indicated by an antenna weight vector, a manner indicated by an antenna weight matrix, a manner of frequency domain transmission diversity, a manner of time domain transmission diversity, a modulation and coding scheme, a reference signal index, a spatial domain transmission filter or a spatial quasi-co-location;
    and/or, the transmission resource comprises at least one of:
    a time domain resource, a frequency domain resource, a code domain resource, a beam domain resource, or an antenna port resource.

3. The method of claim 1, wherein the uplink reference signal comprises at least one of:
    a sounding reference signal, an uplink demodulation reference signal, an uplink phase compensation reference signal, or a reference signal for uplink beam scanning or uplink beam tracking or uplink beam selection;
    and/or, the type of the uplink reference signal comprises at least one of:
    a wideband or full-bandwidth uplink reference signal, a narrowband or sub-band uplink reference signal, a non-precoded or precoded uplink reference signal, a wideband or full-bandwidth non-precoded uplink reference signal, a wideband or full-bandwidth precoded uplink reference signal, a narrowband or sub-band precoded uplink reference signal, a narrowband or sub-band non-precoded uplink reference signal, a beamformed uplink reference signal, a reference signal for uplink or downlink channel measurement, or a reference signal for uplink beam scanning or uplink beam tracking or uplink beam selection.

4. The method of claim 1, comprising:
    indicating the uplink reference signal information to the terminal through at least one of following signalings:
    information for indicating a resource index of the uplink reference signal;
    information for indicating a transmit port of the uplink reference signal;
    information for indicating a precoding matrix index;
    information for indicating the resource index of the uplink reference signal and the precoding matrix index; or
    information for indicating a transmit beam index of the uplink reference signal.

5. The method of claim 1, comprising:
    determining, according to an uplink reference signal of a type 1 transmitted by the terminal, a transmission resource used by one or more uplink reference signals of a type 2, and indicating the transmission resource to the terminal through the signaling.

6. The method of claim 1, comprising:
    determining, according to an uplink reference signal of a type 1 transmitted by the terminal, one or more uplink reference signals of a type 2 based on a quasi-colocation (QCL) criterion or a beam consistency criterion; or a relationship between the uplink reference signal of the type 1 and an uplink reference signal of the type 2 being QCL or beam consistency.

7. The method of claim 1, comprising:
determining, according to an uplink reference signal of a type 2 transmitted by the terminal, a transmission manner of at least one of following information: uplink data, uplink control, downlink data, or downlink control.

8. The method of claim 4, wherein indicating the uplink reference signal information to the terminal through the signaling comprises at least one of:
determining, according to an uplink reference signal of a type 1 transmitted by the terminal, one or more pieces of the information for indicating the resource index of the uplink reference signal, and notifying the information for indicating the resource index of the uplink reference signal to the terminal, wherein the information for indicating the resource index of the uplink reference signal is used for indicating the terminal to transmit at least one uplink reference signal of a type 2;
determining, according to the uplink reference signal of the type 1 transmitted by the terminal, one or more pieces of the information for indicating the resource index of the uplink reference signal and the information for indicating the transmit port of the uplink reference signal, and indicating the information for indicating the resource index of the uplink reference signal and the information for indicating the transmit port of the uplink reference signal as a signaling 1 to the terminal, wherein the signaling 1 is used for indicating the terminal to transmit at least one uplink reference signal of the type 2; or
determining, according to the uplink reference signal of the type 1 transmitted by the terminal, one or more pieces of the information for indicating the resource index of the uplink reference signal and the information for indicating the precoding matrix index, and indicating the information for indicating the resource index of the uplink reference signal and the information for indicating the precoding matrix index as a signaling 2 to the terminal, wherein the signaling 2 is used for indicating the terminal to transmit at least one uplink reference signal of the type 2.

9. The method of claim 5, wherein the uplink reference signal of the type 1 and/or the uplink reference signal of the type 2 is determined in at least one of following manners:
in a manner of agreement;
in a manner of using the information for indicating the resource index of the uplink reference signal;
in a manner indicated by the signaling 1;
in a manner indicated by the signaling 2; or
through a physical downlink control signaling;
or, the uplink reference signal of the type 1 and/or the uplink reference signal of the type 2 comprises at least one of:
a wideband or full-bandwidth uplink reference signal;
a non-precoded wideband or full-bandwidth uplink reference signal;
a precoded wideband or full-bandwidth uplink reference signal;
a non-precoded uplink reference signal;
a wideband or full-bandwidth beamformed uplink reference signal;
a narrowband or sub-band or partial-bandwidth uplink reference signal;

a precoded narrowband or sub-band or partial-bandwidth uplink reference signal;
a non-precoded narrowband or sub-band or partial-bandwidth uplink reference signal;
a precoded uplink reference signal;
a beamformed uplink reference signal; or
a narrowband or sub-band or partial-bandwidth beamformed uplink reference signal.

10. A method for transmitting an uplink reference signal, comprising:
receiving uplink reference signal information indicated by a base station through a signaling, wherein the uplink reference signal information comprises at least one of following information:
information for indicating a transmission manner in which an uplink reference signal is transmitted, information for indicating a transmission resource used for transmitting the uplink reference signal, information for indicating a type of the transmitted uplink reference signal, a cell identifier (ID) used by the uplink reference signal, or a virtual cell ID used by the uplink reference signal; and
transmitting the uplink reference signal according to the uplink reference signal information;
wherein receiving the uplink reference signal information indicated by the base station through the signaling comprises:
receiving M sets of parameters or parameter sets or resources configured, by the base station and through a first signaling, for transmitting the uplink reference signal, wherein M is a positive integer; and
receiving N sets of parameters or parameter sets or resources selected, by the base station and through a second signaling, from the M sets of parameters or parameter sets or resources, wherein N is a positive integer less than or equal to M.

11. The method of claim 10, wherein the uplink reference signal information determined by the base station in a following manner is received:
determining, according to an uplink reference signal of a type 1 transmitted by a terminal, a transmission resource used by one or more uplink reference signals of a type 2.

12. The method of claim 11, wherein the uplink reference signal of the type 1 and/or the uplink reference signal of the type 2 is determined in at least one of following manners:
in a manner of agreement;
in a manner of using the information for indicating the resource index of the uplink reference signal;
in a manner indicated by the signaling 1;
in a manner indicated by the signaling 2; or
through a physical downlink control signaling;
or, the uplink reference signal of the type 1 and/or the uplink reference signal of the type 2 comprises at least one of:
a wideband or full-bandwidth uplink reference signal;
a non-precoded wideband or full-bandwidth uplink reference signal;
a precoded wideband or full-bandwidth uplink reference signal;
a non-precoded uplink reference signal;
a wideband or full-bandwidth beamformed uplink reference signal;
a narrowband or sub-band or partial-bandwidth uplink reference signal;
a precoded narrowband or sub-band or partial-bandwidth uplink reference signal;

a non-precoded narrowband or sub-band or partial-bandwidth uplink reference signal;

a precoded uplink reference signal;

a beamformed uplink reference signal; or a narrowband or sub-band or partial-bandwidth beamformed uplink reference signal.

13. The method of claim 10, wherein the uplink reference signal information determined by the base station in a following manner is received:

determining, according to an uplink reference signal of a type 1 transmitted by a terminal, one or more uplink reference signals of a type 2 based on a quasi-co-location (QCL) criterion or a beam consistency criterion; or a relationship between the uplink reference signal of the type 1 and an uplink reference signal of the type 2 being QCL or beam consistency.

14. The method of claim 10, wherein transmitting the uplink reference signal according to the reference signal information comprises at least one of:

receiving one or more pieces of information used for indicating a resource index of the uplink reference signal and determined by the base station according to a received uplink reference signal of a type 1, and transmitting at least one uplink reference signal of a type 2 according to the information of the resource index of the uplink reference signal;

receiving a signaling 1 from the base station, wherein the signaling 1 comprises one or more pieces of information used for indicating a resource index of the uplink reference signal and information used for indicating a transmit port of the uplink reference signal and determined by the base station according to a received uplink reference signal of the type 1, and transmitting at least one uplink reference signal of the type 2 according to the signaling 1; or receiving a signaling 2 from the base station, wherein the signaling 2 comprises one or more pieces of information used for indicating a resource index of the uplink reference signal and information used for indicating a precoding matrix index and determined by the base station according to a received uplink reference signal of the type 1, and transmitting at least one uplink reference signal of the type 2 according to the signaling 2.

15. The method of claim 10, wherein the transmission manner comprises at least one of:

a transmit beam, a transmit antenna, a transmit sector, precoding at a transmitting end, a manner indicated by an antenna port, a manner indicated by an antenna weight vector, a manner indicated by an antenna weight matrix, a manner of frequency domain transmission diversity, a manner of time domain transmission diversity, a modulation and coding scheme, a reference signal index, a spatial domain transmission filter or a spatial quasi-co-location;

and/or, the transmission resource comprises at least one of:

a time domain resource, a frequency domain resource, a code domain resource, a beam domain resource, or an antenna port resource.

16. The method of claim 10, wherein the uplink reference signal comprises at least one of:

a sounding reference signal, an uplink demodulation reference signal, an uplink phase compensation reference signal, or a reference signal for uplink beam scanning or uplink beam tracking or uplink beam selection;

and/or, the type of the uplink reference signal comprises at least one of:

a wideband or full-bandwidth uplink reference signal, a narrowband or sub-band uplink reference signal, a non-precoded or precoded uplink reference signal, a wideband or full-bandwidth non-precoded uplink reference signal, a wideband or full-bandwidth precoded uplink reference signal, a narrowband or sub-band precoded uplink reference signal, a narrowband or sub-band non-precoded uplink reference signal, a beamformed uplink reference signal, a reference signal for uplink or downlink channel measurement, or a reference signal for uplink beam scanning or uplink beam tracking or uplink beam selection.

17. The method of claim 10, wherein receiving the uplink reference signal information indicated by the base station through the signaling comprises:

indicating the uplink reference signal information to the terminal through at least one of following signalings:

information for indicating a resource index of the uplink reference signal;

information for indicating a transmit port of the uplink reference signal;

information for indicating a precoding matrix index;

information for indicating the resource index of the uplink reference signal and the precoding matrix index; or information for indicating a transmit beam index of the uplink reference signal.

18. The method of claim 10, wherein receiving the uplink reference signal information determined by the base station through the following manner:

determining, based on an uplink reference signal of a type 2 transmitted by the terminal, a transmission manner of at least one of following information: uplink data, uplink control, downlink data, or downlink control;

determining, based on the uplink reference signal information, a transmission manner of at least one of following information: uplink data, uplink control, downlink data, or downlink control.

19. An apparatus for indicating uplink reference signal information, comprising:

an indication module, which is configured to indicate uplink reference signal information to a terminal through a signaling, wherein the uplink reference signal information comprises at least one of following information: information for indicating a transmission manner in which the terminal transmits an uplink reference signal, information for indicating a transmission resource used by the terminal to transmit the uplink reference signal, a type of the uplink reference signal transmitted by the terminal, a cell identifier (ID) used by the uplink reference signal, or a virtual cell ID used by the uplink reference signal;

wherein the indication module comprises:

a transmission unit, which is configured to configure, through a radio resource control (RRC) signaling, M sets of parameters or parameter sets or resources for the terminal to transmit the uplink reference signal, wherein M is a positive integer;

a first selection unit, which is configured to select, through a media access control control element (MAC CE) signaling, N sets of parameters or parameter sets or resources from the M sets of parameters or parameter sets or resources, wherein N is a positive integer less than or equal to M; and a second selection unit, which is configured to select, through a physical downlink control signaling, one set of parameters or parameter sets or resources from the N sets of parameters or parameter sets or resources as the transmission resource;

wherein the parameters or parameter sets or resources comprise at least one of:

cyclic shift information, a frequency domain position, an uplink component carrier index, a bandwidth, a position of a frequency domain transmission comb, a time domain symbol position or index, a physical cell ID or virtual cell ID for generating an uplink reference signal sequence, or an index number of a transmit beam.

20. An apparatus for transmitting an uplink reference signal, comprising:

a reception module, which is configured to receive uplink reference signal information indicated by a base station through a signaling, wherein the uplink reference signal information comprises at least one of following information: information for indicating a transmission manner in which an uplink reference signal is transmitted, information for indicating a transmission resource used for transmitting the uplink reference signal, information for indicating a type of the transmitted uplink reference signal, a cell identifier (ID) used by the uplink reference signal, or a virtual cell ID used by the uplink reference signal; and a first transmission module, which is configured to transmit the uplink reference signal according to the uplink reference signal information;

wherein the reception module is further configured to:

receive M sets of parameters or parameter sets or resources configured, by the base station and through a first signaling, for transmitting the uplink reference signal, wherein M is a positive integer; and receive N sets of parameters or parameter sets or resources selected, by the base station and through a second signaling, from the M sets of parameters or parameter sets or resources, wherein N is a positive integer less than or equal to M;

wherein the parameters or parameter sets or resources comprise at least one of:

cyclic shift information, a frequency domain position, an uplink component carrier index, a bandwidth, a position of a frequency domain transmission comb, a time domain symbol position or index, a physical cell ID or virtual cell ID for generating an uplink reference signal sequence, or an index number of a transmit beam.

* * * * *